(12) United States Patent
Wasti et al.

(10) Patent No.: US 12,244,619 B2
(45) Date of Patent: Mar. 4, 2025

(54) APPARATUSES AND METHODS FOR DETECTING SUSPICIOUS ACTIVITIES THROUGH MONITORED ONLINE BEHAVIORS

(71) Applicant: AT&T Intellectual Property I, L.P., Atlanta, GA (US)

(72) Inventors: Maisam Shahid Wasti, Union City, CA (US); Sai Sharath Japa, Carrollton, TX (US); Ana Armenta, San Jose, CA (US); Prince Paulraj, Coppell, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 356 days.

(21) Appl. No.: 17/480,170

(22) Filed: Sep. 21, 2021

(65) Prior Publication Data
US 2023/0092557 A1   Mar. 23, 2023

(51) Int. Cl.
*H04L 29/06*   (2006.01)
*G06Q 20/40*   (2012.01)
*H04L 9/40*    (2022.01)

(52) U.S. Cl.
CPC ..... *H04L 63/1425* (2013.01); *G06Q 20/4016* (2013.01); *H04L 63/083* (2013.01)

(58) Field of Classification Search
CPC .............. H04L 63/1425; H04L 63/083; H04L 2463/082; G06Q 20/4016
See application file for complete search history.

(56) References Cited

U.S. PATENT DOCUMENTS

| | | | | |
|---|---|---|---|---|
| 8,856,598 B1* | 10/2014 | Madahar | ............ | G06F 11/0709 |
| | | | | 714/47.2 |
| 9,166,995 B1* | 10/2015 | Roundy | .............. | H04L 63/1425 |
| 9,942,255 B1* | 4/2018 | MacDermed | ....... | H04L 63/1466 |
| 10,021,118 B2* | 7/2018 | Wardman | ............. | H04L 63/1416 |
| 10,063,579 B1* | 8/2018 | Machani | ................. | H04L 67/535 |
| 10,803,458 B1* | 10/2020 | Vokes | ................ | G06Q 20/3224 |
| 11,348,415 B2* | 5/2022 | Sanghvi | ........... | G08B 13/19641 |
| 11,503,061 B1* | 11/2022 | Lin | .......................... | G06N 5/04 |
| 11,503,075 B1* | 11/2022 | Sirianni | .............. | H04L 63/1416 |
| 11,843,622 B1* | 12/2023 | Tellez | ..................... | G06N 3/045 |
| 2020/0104849 A1* | 4/2020 | Cai | ......................... | G06Q 40/00 |
| 2023/0007023 A1* | 1/2023 | Andrabi | ............. | H04L 63/1425 |
| 2023/0058138 A1* | 2/2023 | Covell | ................ | H04L 63/0815 |

OTHER PUBLICATIONS

Friedman, Jerome H. , "Greedy Function Approximation: a Gradient Boosting Machine1", 1999 Reitz Lecture, The Annals of Statistics, vol. 29, No. 5, 1189-1232, 2001.

Hochreiter, Sepp et al., "Long Short-Term Memory", Neural Computation 9, 1735-1780, 1997.

\* cited by examiner

*Primary Examiner* — Ka Shan Choy

(74) *Attorney, Agent, or Firm* — Guntin & Gust, PLC; Mark Wilinski

(57) ABSTRACT

Aspects of the subject disclosure may include, for example, monitoring a first activity undertaken by a communication device during a first communication session, generating, based on the monitoring, first data that indicates an amount of time that is spent on the first activity, comparing, based on the generating, the first data to a threshold, and identifying, based on at least the comparing, an action to take when the amount of time that is spent on the first activity exceeds the threshold. Other embodiments are disclosed.

20 Claims, 7 Drawing Sheets

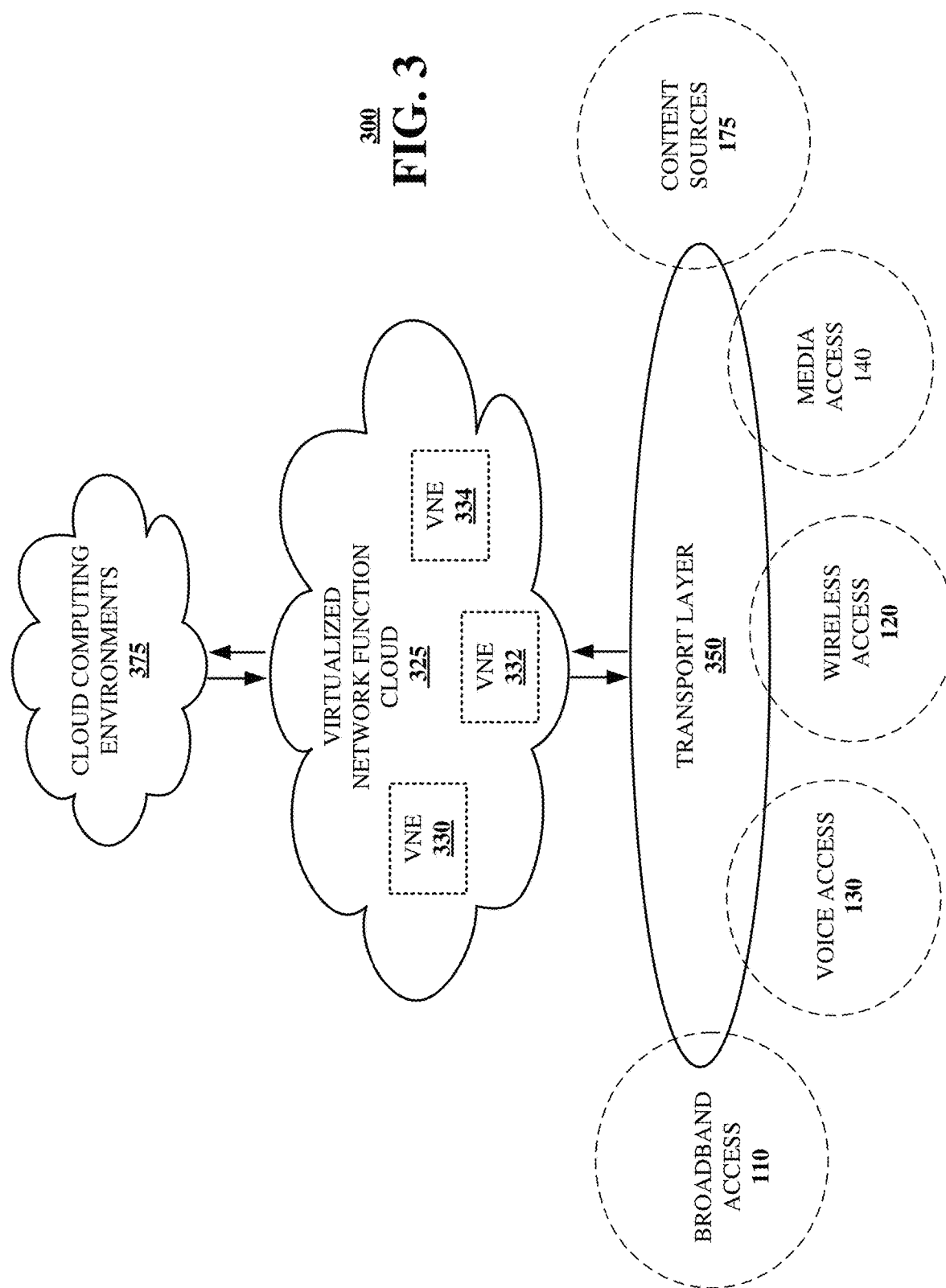

APPARATUSES AND METHODS FOR DETECTING SUSPICIOUS ACTIVITIES THROUGH MONITORED ONLINE BEHAVIORS

FIELD OF THE DISCLOSURE

The subject disclosure relates to apparatuses and methods for detecting suspicious activities through monitored online behaviors.

BACKGROUND

As the world becomes increasingly connected through vast communication networks and via various communication devices, additional opportunities are generated to facilitate communication services in respect of users. However, this increased connectivity is accompanied by an increased risk to users, network operators, and service providers in terms of network safety and security. Given the proliferation of use/connectivity, there is an increased incentive for those that would like to exploit network and device vulnerabilities for a multitude of reasons, such as financial gain. For example, nefarious actors have decided to take advantage of others in a connected context/environment using various tricks, scams, schemes, and the like, often with an intent to defraud the others. Estimates suggest that fraud costs users, network operators, and service providers around the world billions of dollars each year. The retail industry (e.g., online retail, such as e-commerce) is particularly susceptible to fraud, as it is often difficult to detect fraud before it is too late (e.g., before it occurs).

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

The subject disclosure describes, among other things, illustrative embodiments for identifying a probability or likelihood of whether activities occurring in an online environment or context are improper. Other embodiments are described in the subject disclosure.

One or more aspects of the subject disclosure include, in whole or in part, monitoring a first plurality of activities undertaken by a user via a communication device, generating, based on the monitoring, respective first data for each activity of the first plurality of activities that indicates an amount of time that is spent on the activity, generating a score for each activity of the first plurality of activities based on at least the first data, resulting in a plurality of scores, wherein each score of the plurality of scores is representative of a degree that the activity associated with the score is suspicious, and identifying, based on the generating of the score for each activity of the first plurality of activities, an action to take when at least one score included in the plurality of scores exceeds a threshold.

One or more aspects of the subject disclosure include, in whole or in part, monitoring a first activity undertaken by a communication device during a first communication session, generating, based on the monitoring, first data that indicates an amount of time that is spent on the first activity, comparing, based on the generating, the first data to a threshold, and identifying, based on at least the comparing, an action to take when the amount of time that is spent on the first activity exceeds the threshold.

One or more aspects of the subject disclosure include, in whole or in part, identifying a first action taken by a user during a communication session, generating, based on the identifying of the first action, first data that represents a first amount of time taken by the user to perform the first action, identifying a second action taken by the user during the communication session, generating, based on the identifying of the second action, second data that represents a second amount of time taken by the user to perform the second action, comparing the first data to a first threshold and the second data to a second threshold, and identifying, based at least on the comparing, an action to take in respect of the user.

Figure 1:
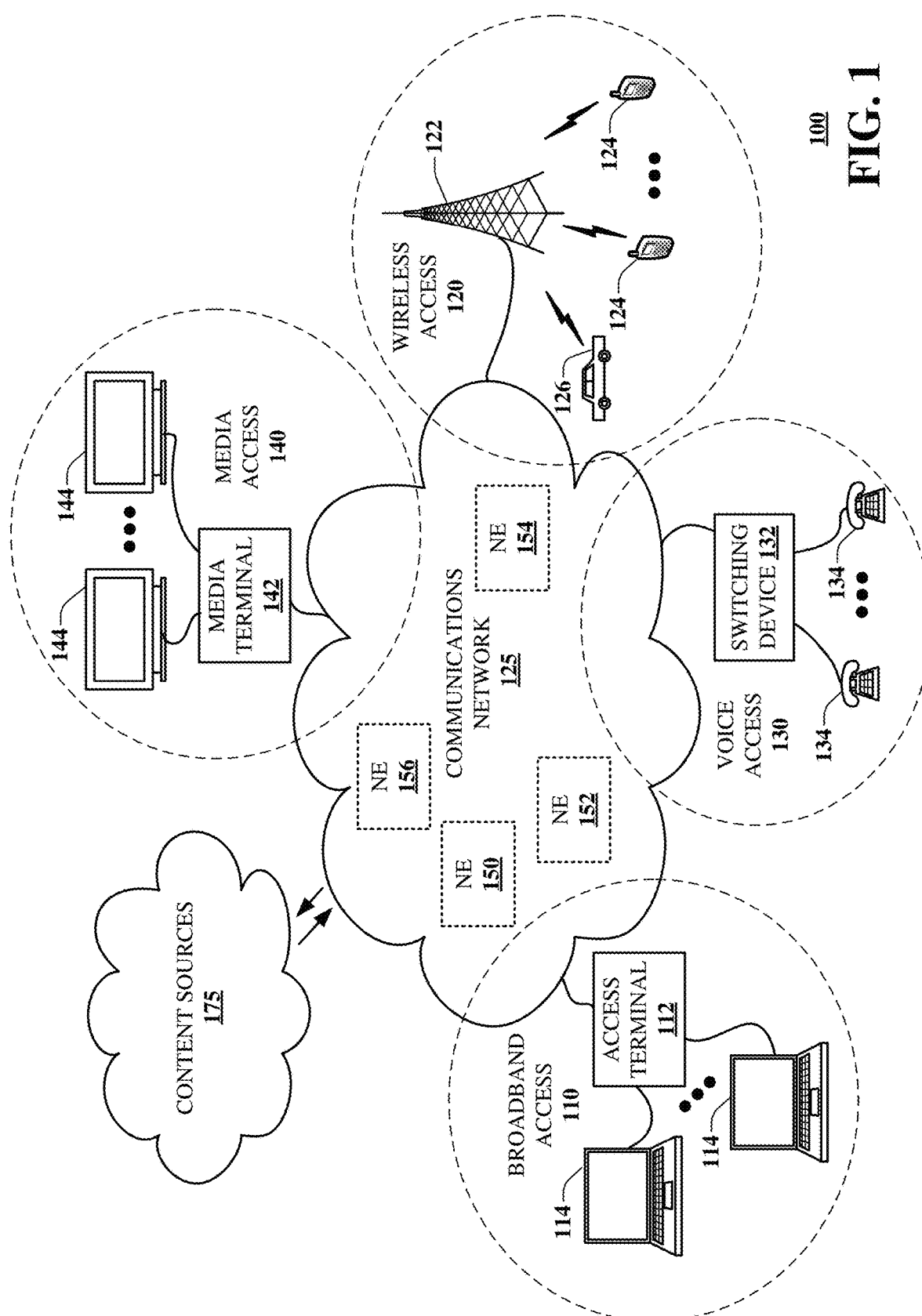
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a system 100 in accordance with various aspects described herein. For example, system 100 can facilitate in whole or in part monitoring a first plurality of activities undertaken by a user via a communication device, generating, based on the monitoring, respective first data for each activity of the first plurality of activities that indicates an amount of time that is spent on the activity, generating a score for each activity of the first plurality of activities based on at least the first data, resulting in a plurality of scores, wherein each score of the plurality of scores is representative of a degree that the activity associated with the score is suspicious, and identifying, based on the generating of the score for each activity of the first plurality of activities, an action to take when at least one score included in the plurality of scores exceeds a threshold. System 100 can facilitate in whole or in part monitoring a first activity undertaken by a communication device during a first communication session, generating, based on the monitoring, first data that indicates an amount of time that is spent on the first activity, comparing, based on the generating, the first data to a threshold, and identifying, based on at least the comparing, an action to take when the amount of time that is spent on the first activity exceeds the threshold. System 100 can facilitate in whole or in part identifying a first action taken by a user during a communication session, generating, based on the identifying of the first action, first data that represents a first amount of time taken by the user to perform the first action, identifying a second action taken by the user during the communication session, generating, based on the identifying of the second action, second data that represents a second amount of time taken by the user to perform the second action, comparing the first data to a first threshold and the second data to a second threshold, and identifying, based at least on the comparing, an action to take in respect of the user.

In particular, in FIG. 1 a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
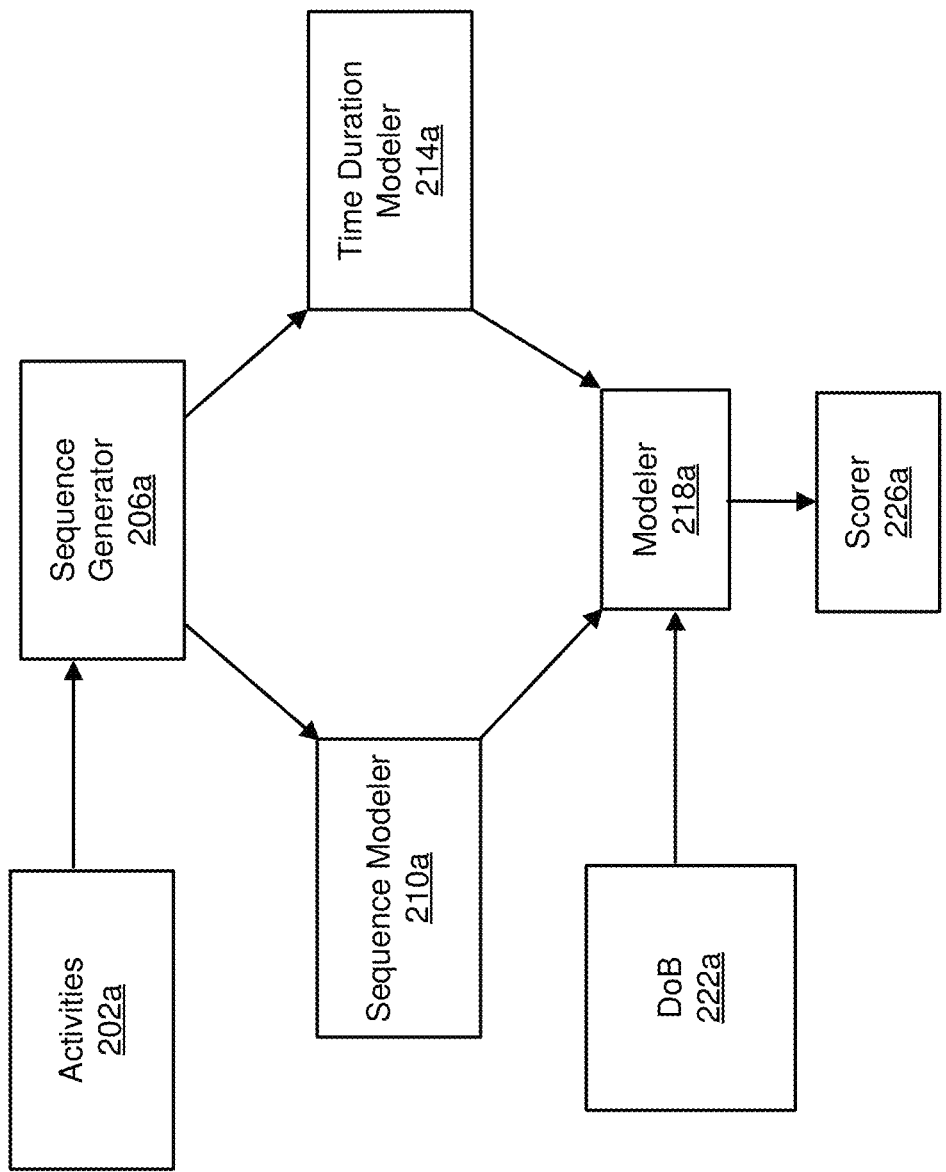
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200a in accordance with various aspects described herein. In some embodiments, the system 200a may function within, or may be operatively overlaid upon, the communication network 100 of FIG. 1. The system 200a may be implemented using hardware, firmware, software, or any combination thereof. As described in further detail below, the system 200a may be used to detect suspicious or improper activities, potentially inclusive of identifying fraudulent activities, in an online or connected context/environment.

As shown in FIG. 2A, one or more activities 202a may serve as an input to a sequence generator 206a. The activities 202a may pertain to a particular user/individual (such as for example a user or individual associated with an account with a service provider) or a group of users/individuals. The activities 202a may pertain to a particular session (e.g., a particular communication session) or may pertain to multiple sessions. The activities 202a may include indicators of specific actions having been taken, such as for example selections made in a web browser environment, within an application, etc. Analogously, the activities 202a may include indicators of a lack of activity, such as for example a lack of selections being made. The activities 202a may be represented in the system 200a as data or metadata.

The sequence generator 206a may process the (data or metadata of the) activities 202a to generate one or more sequences. Each of the sequences may be representative of a subset of the activities 202a, which is to say that a sequence may include a combination/aggregation of activities included in the activities 202a. As one skilled in the art will appreciate based on a review of this disclosure, each of the activities 202a taken alone or in isolation might not be suspicious in-and-of-itself, but combinations of activities (e.g., sequences or trajectories of activities) may be. For example, and as described further below, combinations of activities may yield patterns that may be suggestive of suspicious or improper activities being afoot. The sequences generated by the sequence generator 206a may be provided as input to a sequence modeler 210a and/or a time duration modeler 214a.

As the nomenclature implies, the sequence modeler 210a may identify sequences/patterns in the data or metadata of the activities 202a to flag patterns that may warrant further analysis or investigation. For example, an order of selections or other activities (or, analogously, a lack of selections or activities) made by a user in an online context (as identified by the sequence modeler 210a) may suggest that suspicious or improper activity may be occurring/ongoing.

The time duration modeler 214a may identify/flag the data or metadata of the activities 202a for further analysis or investigation based on a time/temporal element associated with the data/metadata. To demonstrate, one or more activities or patterns or sequences of actions taken by a user (as potentially identified by the sequence modeler 210a), standing alone, might not be suspicious. However, those same activities, patterns, or sequences of actions may be suspicious if, for example, the user spends an excessive amount of time (e.g., an amount of time greater than a threshold) on one or more of the activities, spends an excessive amount of time transitioning from one activity to the next, etc. Similarly, if the user spends too little time (e.g., an amount of time that is less than a threshold) on one or more activities, spends too little time transitioning from one activity to the next, etc., that may be suggestive of suspicious or improper activities. In this regard, the (data or metadata of the) activities 202a and/or the sequences generated by the sequence generator 206a may include timestamps or other indicators indicative of when particular activities in question occurred to facilitate processing or analysis by the time duration modeler 214a.

The outputs of the sequence modeler 210a and/or the time duration modeler 214a may be provided as inputs to a modeler 218a. The modeler 218a may be operative in accordance with a tree-based modeling technology/tree-based model. A tree-based model may be particularly suitable for use in connection with the modeler 218a due to an ability of a tree-based model to deal with sparsity in terms of time duration features associated with, e.g., the outputs of the time duration modeler 214a.

In some embodiments, the modeler 218a may obtain inputs from a database of behaviors (DoB) 222a. The DoB 222a may store data indicative of past behaviors or actions that a user, or a group of users, has undertaken. The inputs from the DoB 222a may be used as part of supplemental analyses or examination processes undertaken by the modeler 218a to refine or adjust/modify the outputs of the sequence modeler 210a and/or the time duration modeler 214a. To demonstrate, if the sequence modeler 210a flags activities of a user as being suspicious (such as, for example, the user changing a password on her account followed immediately thereafter by an attempt to purchase a product in an amount (in terms of quantity or cost) greater than threshold), the DoB 222a may contain data that indicates that the user changes her password often, particularly in advance of making major/large purchases. In another example, if the time duration modeler 214a flags the activities of the user as being suspicious (for example, the user is spending an excessive amount of time [e.g., an amount of time greater than a threshold] entering a code associated with a two-factor authentication (2FA) activity or technology), the user's history (as represented in the data of the DoB 222a) may indicate that the user spends more than an average amount of time (relative to a pool of users at large) entering a 2FA code (perhaps to avoid the nuisance of having to enter a code multiple times).

As the foregoing examples demonstrate, while the activities/behaviors of a user may appear suspicious on their face (e.g., may appear suspicious relative to a typical or average user), the activities might not be suspicious given the user's history/record of activities. Similarly, activities of a user might not appear suspicious on their face, but deviations from historical user behavior or records in an amount greater than a threshold may suggest that suspicious or improper activity is in progress or has occurred. As one skilled in the art will appreciate, aspects of the system 200a (inclusive of aspects of the modeler 218a and the DoB 222a) may include machine learning (ML) and/or artificial intelligence (AI) technologies to enhance the accuracy of one or more outputs generated by/within the system 200a.

The outputs of the modeler 218a may be provided as inputs to a scorer 226a (or, analogously, a scoring algorithm). The scorer 226a may generate one or more scores based on the inputs that the scorer 226a obtains. The scores, which may include numerical values, may include a representation of a probability or likelihood of whether improper activity (e.g., fraud) is being engaged in by one or more users or devices. The scores may include a confidence factor that may indicate a confidence in the probability/likelihood of whether the improper activity is being engaged in. The scores may be used by decision-making processes/logic to identity one or more actions to take (e.g., prohibit a transaction from occurring, suspending an account or service, terminating an account or service, prohibiting a user from accessing another user's profile, etc.).

While functionality was described above as being resident in particular entities of FIG. 2A, it is appreciated that the functionality may be reassigned/reallocated to other entities without departing from the scope and spirit of this disclosure. In this regard, the allocation of given functions/functionality to given entities as set forth above is illustrative.

Figure 2B:
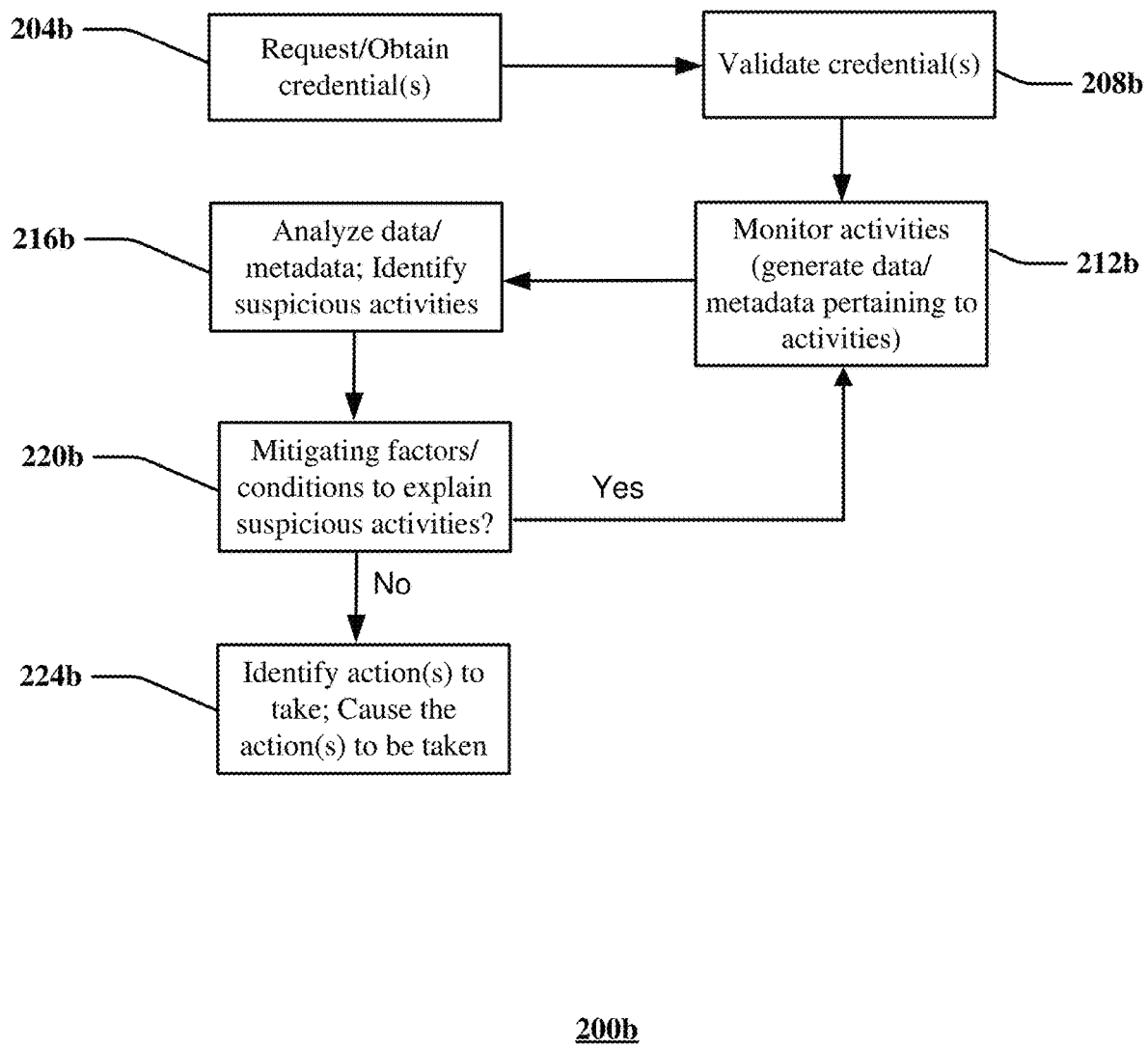
FIG. 2B depicts an illustrative embodiment of a method in accordance with various aspects described herein.

Referring now to FIG. 2B, an illustrative embodiment of a method 200b in accordance with various aspects described herein is shown. The method 200b may be implemented (e.g., executed), in whole or in part, in conjunction with one or more systems, devices, and/or components, such as for example the systems, devices, and components set forth herein. The method 200b may be implemented to facilitate a performance of one or more operations, including for example the operations described below in connection with various blocks of FIG. 2B. The method 200b may be executed to identify behaviors or activities that are suspicious or improper in an amount greater than a threshold. By analogy, aspects of the method 200b may be executed to identify behaviors or activities that are (likely) proper/acceptable. In some instances, the behaviors or activities may occur, in whole or in part, in relation to an online or connected context/environment.

In block 204b, user credentials may be obtained/received. For example, in the context of a user attempting to subscribe to a service associated with a device, the user may be requested to present a government issued identification. In an online context where a user is signing/logging into an account associated with a service, the user may be requested to provide a username and password, a personal identification number (PIN), a biometric credential (e.g., a picture for facial recognition, a retinal scan, etc.), etc. In some embodiments, block 204b may include a presentation of device-based credentials for validation, such as for example a certificate that is signed by a trusted third-party entity.

In block 208b, the credential(s) of block 204b may be verified/validated. For example, block 208b may include a comparison of the credential(s) supplied as part of block 204b against a database of established credential(s). If the credential(s) that was/were supplied as part of block 204b are valid (as determined in block 208b), flow may continue to, e.g., block 212b as shown in FIG. 2B. On the other hand, if the credential(s) supplied as part of block 204b are invalid (as determined in block 208b), the method 200b may end (to prevent unauthorized or unauthenticated access).

In block 212b, data and/or metadata may be generated pertaining to activities. For example, in an online or connected context block 212b may include generating data/metadata related to user selections (or, analogously, a lack of user selections), such as for example a placement of a product or service into a virtual shopping cart, entry of details pertaining to a method of payment, entry of a shipping address, etc. In relation to an attempted purchase of a device in a store, block 212b may include data related to user selections of device type (e.g., make and model), color, case type, etc. In some embodiments, the data or metadata may include or incorporate timestamps or other time-based indicators to facilitate a time or temporal-based analysis, as described below. The data or metadata of block 212b may be generated based on a monitoring of the activities.

In block 216b, the data/metadata of block 212b may be analyzed. For example, the analysis of block 216b may serve to identify whether the activities of block 212 are suspicious or improper, a degree/extent to which the activities are deemed to be suspicious/improper, etc. The block 216b may include an identification of sequences of activities that appear to be suspicious or improper. Block 216b may include an identification of one or more activities, or sequences of activities, that are deemed to have been performed too slowly (e.g., were performed in an amount of time greater than a threshold) or too fast (e.g., were performed in an amount of time less than a threshold). In some embodiments, block 216b may include a generation of one or more scores that may be assessed to determine whether activities are suspicious/improper.

In block 220b, a determination may be made whether there are mitigating factors or conditions that may help to explain any suspicious activities identified as part of block 216b. For example, in some instances an occurrence of an event or condition (e.g., a user having dropped her smartphone within 1 month of having purchased it) may help to explain why a user has engaged in might otherwise be considered to be anomalous behaviors (e.g., users typically obtain a new smartphone every 24 months, coinciding with a completion of a contracted for term of service). In some embodiments, a log or record of user behaviors may be consulted as part of block 220b to determine whether a particular user's behaviors or activities depart from the norm/convention (for that particular user, or a pool/group of users at large) in an amount greater than a threshold. Block 220b may include an adjustment of one or more scores (e.g., one or more scores generated as part of block 216b) based on an identification of mitigating factors or conditions.

If, in block 220b a determination is made that there are mitigating factor/conditions to explain the suspicious activities (as potentially represented by the adjusted scores), then no further action may be warranted and the method 220b may end or go back to block 212b to continue monitoring behaviors or activities. On the other hand, if (as part of block 220b it is determined that) there are no mitigating factors/conditions to explain the suspicious activities, or the mitigating factors/conditions that are present are not especially persuasive/impactful (as indicated in the adjusted scores), flow may proceed to block 224b.

In block 224b, one or more actions to take may be identified. For example, the action(s) may be based on the nature of the activities/behaviors that are suspected, the degree/impact that those activities/behaviors will have on: a user or group of users, a device, a network operator or service provider, etc., or any combination thereof. The action(s) may be invoked or caused to happen as part of block 224b. Without limitation, examples of actions that may be taken in respect of block 224b may include: denying or rejecting a transaction from occurring, suspending user or device access to a service, terminating user or device access to a service, preventing a user or device from contacting another user or device on/within a platform (e.g., a social media platform), imposing a penalty on a user (e.g., a monetary policy, such as a fine; degrading/decreasing a quality of service for the user, such as a data rate/speed of a user's download capability on a network), reporting/referring the user to one or more authorities (e.g., police, investigative bodies/authorities, etc.), etc., or any combination thereof.

Block 224b may include a generation of one or more messages, reports, or the like. These messages, reports, etc., may be saved/stored in one or more storage devices, databases, etc. The reports may include a record of activities/behaviors, actions taken in response thereto, etc. These reports may be assessed at a future point/date to identify changes in user behaviors/activities, improvements in an identification of actions to take, etc.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

As set forth above, aspects of this disclosure may utilize various models to identify suspicious or improper behaviors or activities, potentially as part of one or more algorithms. For example, a scoring algorithm may be utilized to generate a score that is indicative of whether user activity or behavior is improper (or, analogously, proper). In some embodiments, user selections or decisions may be incorporated as part of data or metadata that may be subject to scrutiny or analysis.

Aspects of this disclosure may be implemented/incorporated as part of one or more practical applications. For example, aspects of this disclosure may be used in conjunction with one or more fraud detection and/or machine learning technologies or applications to monitor online activities (potentially inclusive of one or more web-clicks or selections). An analysis that is performed may include an analysis of data or metadata. The analysis may yield indicators of suspicious activities that may be flagged/marked for additional examination/analyses. In some embodiments, patterns of online activities/behaviors may be identified. The identified patterns may be suggestive of suspicious activities. Based on the identification of the patterns, damages may be mitigated (e.g., prevented), which can result in significant savings to users, network operators, and service providers.

Aspects of this disclosure represent significant improvements relative to conventional technologies. For example, aspects of this disclosure may serve to enhance accuracy regarding an identification of suspicious activities, such as a commission of a fraud, in an online or connected context. When a user is detected as having engaged in one or more suspicious activities, her account or service may be suspended or terminated (e.g., temporarily or permanently suspended or terminated). Perhaps just as importantly, aspects of this disclosure may be used to quickly clear/absolve a user of a charge of wrong-doing when the user has, in fact, acted in honest or legitimate ways. Avoiding a premature or unwarranted suspension or termination of service may be important to a network operator or service provider from the perspective of maintaining user (e.g., subscriber) loyalty by reducing (e.g., minimizing) service down-time when the circumstances or conditions do not warrant such down-time.

As set forth above, aspects of this disclosure may monitor and examine user activities in an online or connected context/environment to assess whether improper or suspicious activities are being engaged in. Such aspects are based on a recognition that nefarious actors (e.g., fraudsters) tend to spend more time on 2FA activities. For example, such nefarious actors typically do not have in their possession the device of a legitimate user, and frequently use social engineering to obtain, e.g., an authentication credential (e.g., a one-time personal identification number [PIN]) to obtain access to the legitimate user's account with a service provider or network operator. In the context of acquiring a device, nefarious actors rarely spend much, if any, time browsing aesthetic characteristics (e.g., shell or exterior case colors) associated with the device. Nefarious actors tend to complete an order or other transaction quickly (e.g., in an amount less than a threshold) and tend to logout thereafter to reduce their (online) footprint. Many nefarious actors tend to know exactly what they are doing (based on preparation, repetition, experience, etc.) and tend to be quicker at performing many activities relative to typical users. Of course, characteristics associated with nefarious actors may change, and aspects of this disclosure may adapt in response thereto. Models that are utilized to detect suspicious or improper activities may adapt over time, which is to say that the models may be "living models" that may be modified in accordance with ML and/or AI technologies. A recognition of characteristics that tend to be shared amongst nefarious actors can be exploited/utilized to identify when suspicious or improper activities may be transpiring.

In some embodiments, a "totality of the circumstances" approach may be utilized to identify/determine when improper activities are suspected. In this regard, a multitude of factors or considerations may be analyzed/assessed to derive/drive outputs as part of one or more decision-making processes or algorithms. Those factors or considerations may be weighted relative to one another, using one or more weights, to emphasize a first factor/consideration relative to other factors/considerations. In this respect, aspects of this disclosure may facilitate/utilize an ensemble of various models, algorithms, inputs, activities, data, metadata, etc., to generate one or more outputs. Feedback regarding an accuracy of the outputs may be generated to facilitate future iterations or executions of various methodologies and reduce any error in one or more outputs that are generated going forward.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200a, and method 200b presented in FIGS. 1, 2A, and 2B. For example, virtualized communication network 300 can facilitate in whole or in part monitoring a first plurality of activities undertaken by a user via a communication device, generating, based on the monitoring, respective first data for each activity of the first plurality of activities that indicates an amount of time that is spent on the activity, generating a score for each activity of the first plurality of activities based on at least the first data, resulting in a plurality of scores, wherein each score of the plurality of scores is representative of a degree that the activity associated with the score is suspicious, and identifying, based on the generating of the score for each activity of the first plurality of activities, an action to take when at least one score included in the plurality of scores exceeds a threshold. Virtualized communication network 300 can facilitate in whole or in part monitoring a first activity undertaken by a communication device during a first communication session, generating, based on the monitoring, first data that indicates an amount of time that is spent on the first activity, comparing, based on the generating, the first data to a threshold, and identifying, based on at least the comparing, an action to take when the amount of time that is spent on the first activity exceeds the threshold. Virtualized communication network 300 can facilitate in whole or in part identifying a first action taken by a user during a communication session, generating, based on the identifying of the first action, first data that represents a first amount of time taken by the user to perform the first action, identifying a second action taken by the user during the communication session, generating, based on the identifying of the second action, second data that represents a second amount of time taken by the user to perform the second action, comparing the first data to a first threshold and the second data to a second threshold, and identifying, based at least on the comparing, an action to take in respect of the user.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
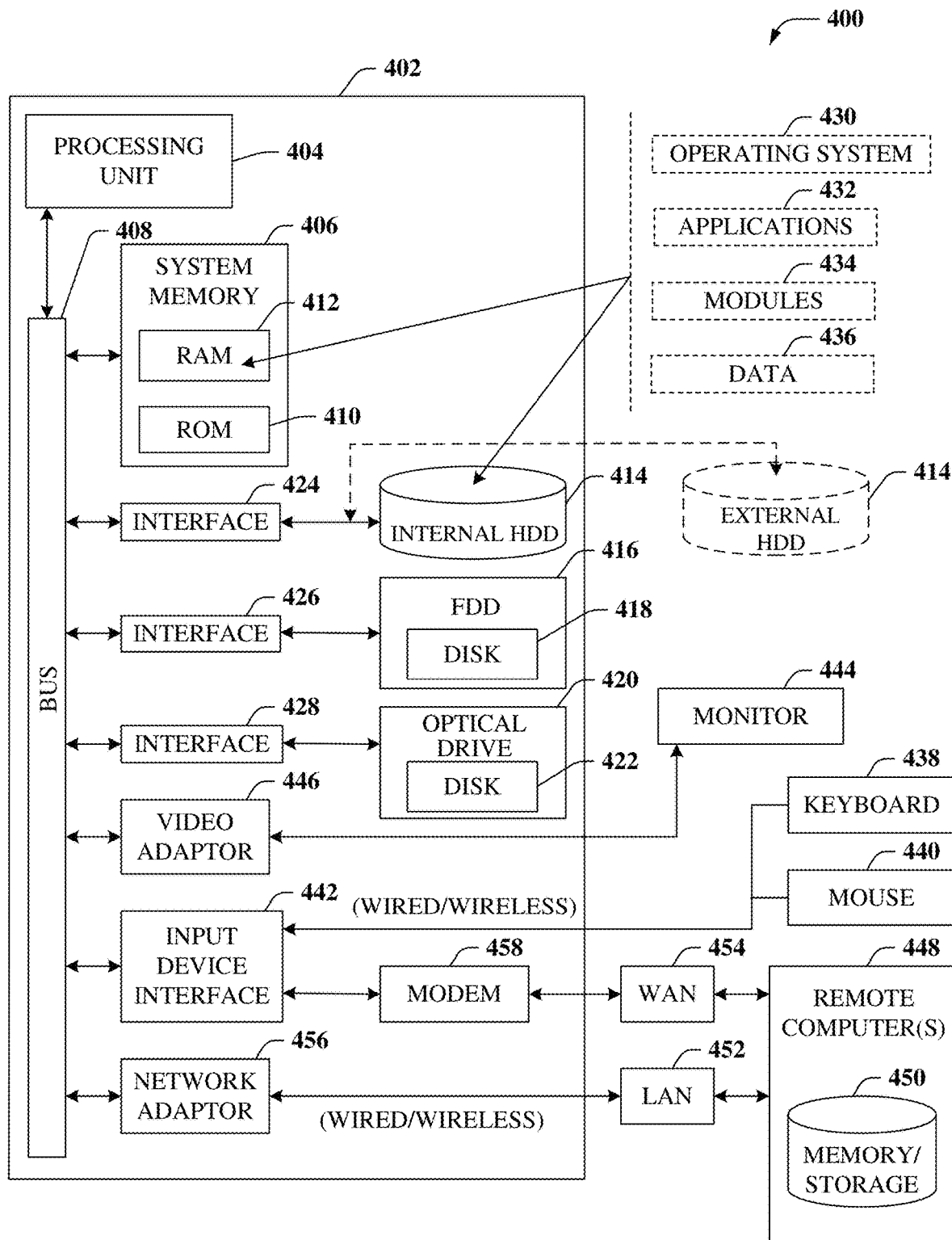
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part monitoring a first plurality of activities undertaken by a user via a communication device, generating, based on the monitoring, respective first data for each activity of the first plurality of activities that indicates an amount of time that is spent on the activity, generating a score for each activity of the first plurality of activities based on at least the first data, resulting in a plurality of scores, wherein each score of the plurality of scores is representative of a degree that the activity associated with the score is suspicious, and identifying, based on the generating of the score for each activity of the first plurality of activities, an action to take when at least one score included in the plurality of scores exceeds a threshold. Computing environment 400 can facilitate in whole or in part monitoring a first activity undertaken by a communication device during a first communication session, generating, based on the monitoring, first data that indicates an amount of time that is spent on the first activity, comparing, based on the generating, the first data to a threshold, and identifying, based on at least the comparing, an action to take when the amount of time that is spent on the first activity exceeds the threshold. Computing environment 400 can facilitate in whole or in part identifying a first action taken by a user during a communication session, generating, based on the identifying of the first action, first data that represents a first amount of time taken by the user to perform the first action, identifying a second action taken by the user during the communication session, generating, based on the identifying of the second action, second data that represents a second amount of time taken by the user to perform the second action, comparing the first data to a first threshold and the second data to a second threshold, and identifying, based at least on the comparing, an action to take in respect of the user.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
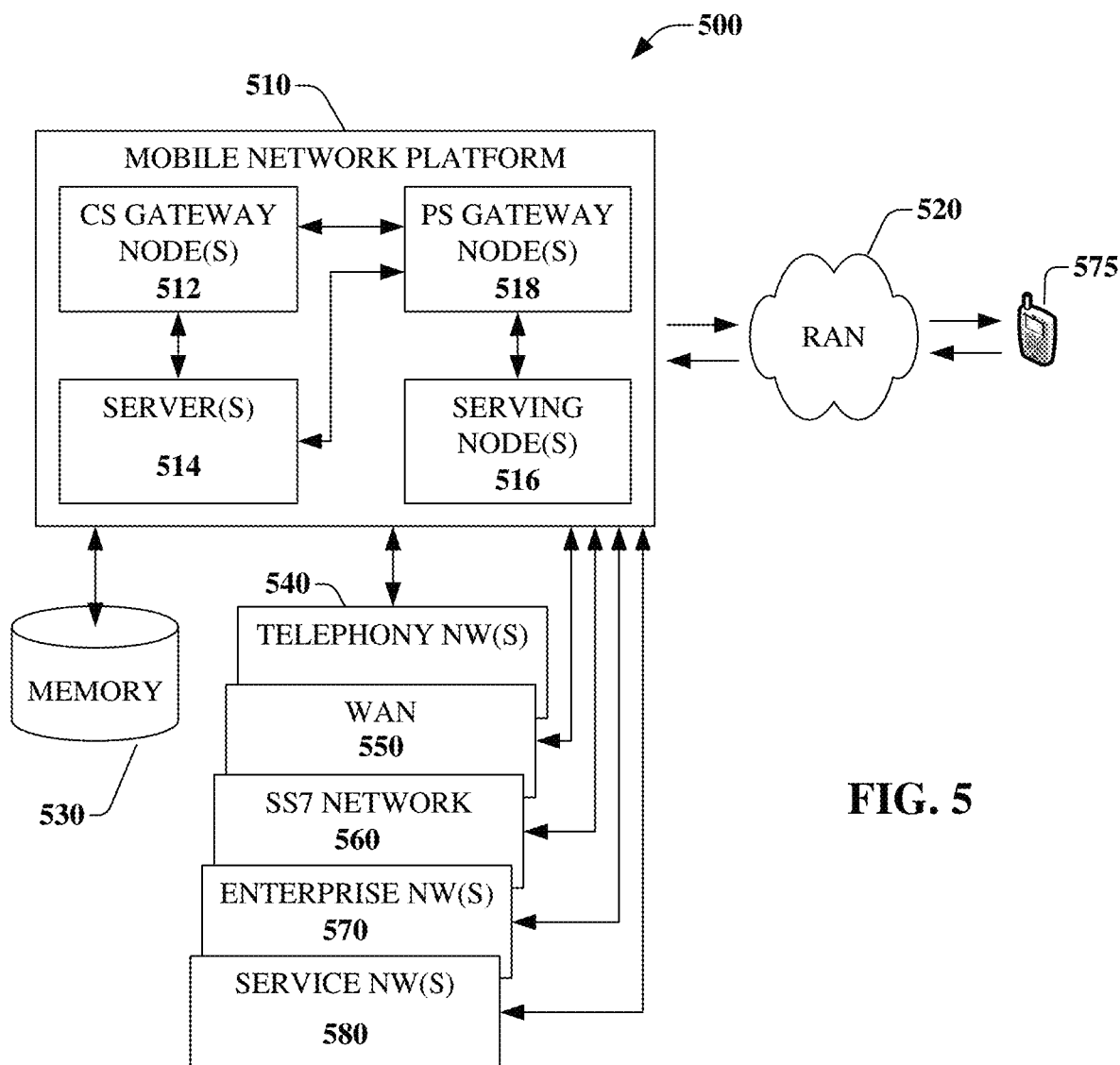
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part monitoring a first plurality of activities undertaken by a user via a communication device, generating, based on the monitoring, respective first data for each activity of the first plurality of activities that indicates an amount of time that is spent on the activity, generating a score for each activity of the first plurality of activities based on at least the first data, resulting in a plurality of scores, wherein each score of the plurality of scores is representative of a degree that the activity associated with the score is suspicious, and identifying, based on the generating of the score for each activity of the first plurality of activities, an action to take when at least one score included in the plurality of scores exceeds a threshold. Platform 510 can facilitate in whole or in part monitoring a first activity undertaken by a communication device during a first communication session, generating, based on the monitoring, first data that indicates an amount of time that is spent on the first activity, comparing, based on the generating, the first data to a threshold, and identifying, based on at least the comparing, an action to take when the amount of time that is spent on the first activity exceeds the threshold. Platform 510 can facilitate in whole or in part identifying a first action taken by a user during a communication session, generating, based on the identifying of the first action, first data that represents a first amount of time taken by the user to perform the first action, identifying a second action taken by the user during the communication session, generating, based on the identifying of the second action, second data that represents a second amount of time taken by the user to perform the second action, comparing the first data to a first threshold and the second data to a second threshold, and identifying, based at least on the comparing, an action to take in respect of the user.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
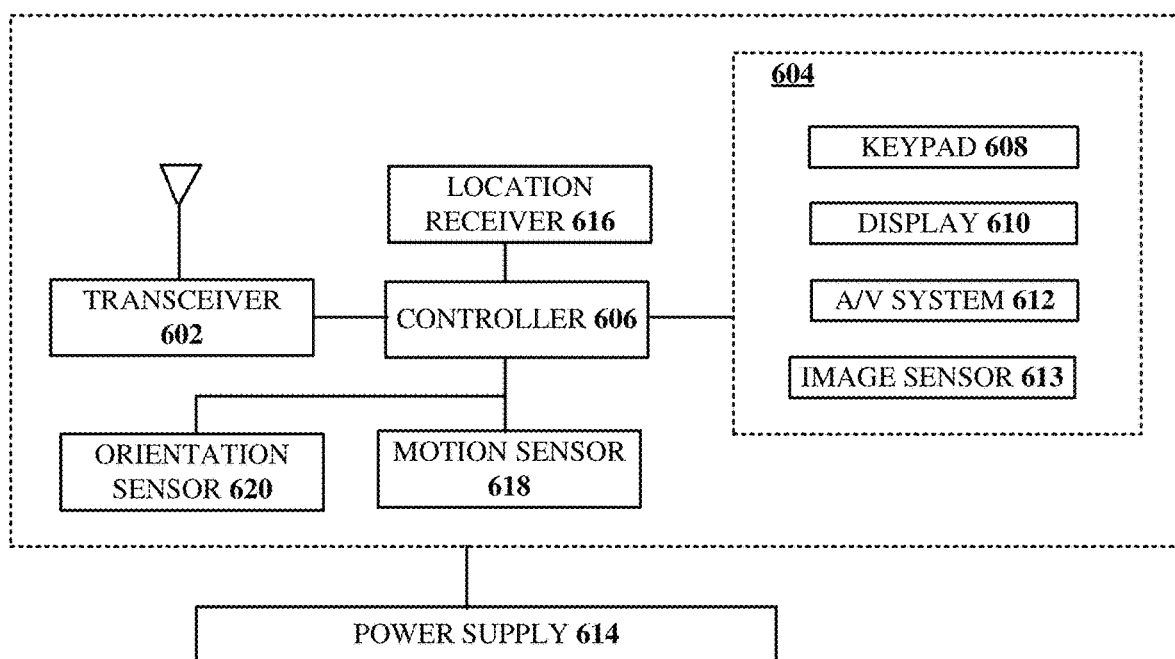
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part monitoring a first plurality of activities undertaken by a user via a communication device, generating, based on the monitoring, respective first data for each activity of the first plurality of activities that indicates an amount of time that is spent on the activity, generating a score for each activity of the first plurality of activities based on at least the first data, resulting in a plurality of scores, wherein each score of the plurality of scores is representative of a degree that the activity associated with the score is suspicious, and identifying, based on the generating of the score for each activity of the first plurality of activities, an action to take when at least one score included in the plurality of scores exceeds a threshold. Computing device 600 can facilitate in whole or in part monitoring a first activity undertaken by a communication device during a first communication session, generating, based on the monitoring, first data that indicates an amount of time that is spent on the first activity, comparing, based on the generating, the first data to a threshold, and identifying, based on at least the comparing, an action to take when the amount of time that is spent on the first activity exceeds the threshold. Computing device 600 can facilitate in whole or in part identifying a first action taken by a user during a communication session, generating, based on the identifying of the first action, first data that represents a first amount of time taken by the user to perform the first action, identifying a second action taken by the user during the communication session, generating, based on the identifying of the second action, second data that represents a second amount of time taken by the user to perform the second action, comparing the first data to a first threshold and the second data to a second threshold, and identifying, based at least on the comparing, an action to take in respect of the user.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4 . . . xn), to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
monitoring a first plurality of activities undertaken by a user via a communication device, wherein the first plurality of activities is represented by first indicators of specific actions having been taken and second indicators of a lack of activity, the specific actions having been taken including first selections made in a web browser environment and second selections made within an application, and the lack of activity including a lack of third selections having been made;
generating, based on the monitoring, respective first data for each activity of the first plurality of activities that indicates an amount of time that is spent on the activity;
generating a score for each activity of the first plurality of activities based on at least the first data, resulting in a plurality of scores, wherein each score of the plurality of scores is representative of a degree that the activity associated with the score is suspicious, and wherein each score of the plurality of scores includes a confidence factor that indicates a confidence in a probability of whether the activity is improper; and
identifying, based on the generating of the score for each activity of the first plurality of activities, an action to take when at least one score included in the plurality of scores exceeds a threshold, wherein the action comprises: decreasing a data rate of the communication device and referring the user to the police.

2. The device of claim 1, wherein the operations further comprise:
requesting a credential from the user of the communication device;
obtaining the credential from the communication device; and
validating, based on the obtaining, the credential,
wherein the monitoring is responsive to the validating.

3. The device of claim 1, wherein the first plurality of activities comprises an entry of a code by the user, wherein the code is associated with a two-factor authentication technology, wherein the first plurality of activities includes a completion of an order, and wherein the first plurality of activities includes a logout activity.

4. The device of claim 1, wherein the operations further comprise:
generating, based on the monitoring, second data, wherein the second data represents a sequence of the activities included in the first plurality of activities.

5. The device of claim 4, wherein the generating of the score for each activity of the first plurality of activities is further based on the second data.

6. The device of claim 1, wherein the operations further comprise:
obtaining second data associated with a historical record of activities of the user.

7. The device of claim 6, wherein the generating of the score for each activity of the first plurality of activities is further based on the second data.

8. The device of claim 6, wherein respective data included in the second data indicates an amount of time that is spent on each activity of a second plurality of activities included in the historical record.

9. The device of claim 8, wherein the operations further comprise:
comparing an amount of time that is spent on an activity of the second plurality of activities to an amount of time that is spent on an activity of the first plurality of activities.

10. The device of claim 9, wherein the generating of the score for each activity of the first plurality of activities is further based on the comparing of the amount of time that is spent on the activity of the second plurality of activities to the amount of time that is spent on the activity of the first plurality of activities.

11. The device of claim 1, wherein the generating of the score utilizes a tree-based model.

12. The device of claim 1, wherein the operations further comprise:
identifying a mitigating factor associated with the at least one score,
wherein the identifying of the action is further based on the identifying of the mitigating factor.

13. The device of claim 1, wherein the operations further comprise:
causing the action to be taken based on the identifying of the action.

14. The device of claim 1, wherein the action comprises: denying a transaction from occurring, suspending access to a first service, and terminating access to a second service.

15. A non-transitory machine-readable medium, comprising executable instructions that, when executed by a processing system including a processor, facilitate performance of operations, the operations comprising:
monitoring a first activity undertaken by a communication device during a first communication session, wherein the first activity is represented by first indicators of specific actions having been taken and second indicators of a lack of activity, the specific actions having been taken including first selections made in a web browser environment and second selections made within an application, and the lack of activity including a lack of third selections having been made;
generating, based on the monitoring, first data that indicates an amount of time that is spent on the first activity;
comparing, based on the generating, the first data to a threshold;
generating a first score for the first activity based on at least the first data, wherein first score is representative of a degree that the first activity is suspicious, and wherein the first score includes a first confidence factor that indicates a first confidence in a probability of whether the first activity is improper; and
identifying, based on at least the comparing and the generating of the first score, an action to take when the amount of time that is spent on the first activity exceeds the threshold, wherein the action comprises: decreasing a data rate of the communication device and referring a first user of the communication device to the police.

16. The non-transitory machine-readable medium of claim 15, wherein the operations further comprise:
monitoring a second activity; and generating, based on the monitoring of the second activity, second data that represents a sequence of activities, the sequence of activities including the first activity and the second activity,
wherein the identifying of the action to take is further based on the second data.

17. The non-transitory machine-readable medium of claim 16, wherein the second activity is undertaken by the communication device, the second activity occurring during one of the first communication session or a second communication session.

18. The non-transitory machine-readable medium of claim 16, wherein the second activity is undertaken by a second communication device, and wherein the second communication device is associated with a second user that is different from the first user.

19. A method, comprising:
identifying, by a processing system including a processor, a first action taken by a user during a communication session, wherein the first action is represented by first indicators of specific actions having been taken and second indicators of a lack of activity, the specific actions having been taken including first selections made in a web browser environment and second selections made within an application, and the lack of activity including a lack of third selections having been made;
generating, by the processing system and based on the identifying of the first action, first data that represents a first amount of time taken by the user to perform the first action;
generating, by the processing system, a first score for the first action based on at least the first data, wherein first score is representative of a degree that the first action is suspicious, and wherein the first score includes a first confidence factor that indicates a first confidence in a probability of whether the first action is improper;
identifying, by the processing system, a second action taken by the user during the communication session;
generating, by the processing system and based on the identifying of the second action, second data that represents a second amount of time taken by the user to perform the second action;
comparing, by the processing system, the first data to a first threshold and the second data to a second threshold; and
identifying, by the processing system and based at least on the comparing and the generating of the first score, an action to take in respect of the user, wherein the action comprises: decreasing a data rate of a download capability of a communication device associated with the user, preventing the user from contacting another user associated with a second communication device, imposing a penalty that includes a monetary fine on the user, and referring the user to the police.

20. The method of claim 19, further comprising:
generating, by the processing system, third data that represents an identification of a sequence of actions performed during the communication session, the identification of the sequence of actions including an indication that the second action occurs subsequent to the first action during the communication session,
wherein the identifying of the action to take in respect of the user is further based on the third data.

* * * * *